No. 717,488. Patented Dec. 30, 1902.
J. E. WOODBRIDGE.
METHOD OF TRANSFORMING ALTERNATING CURRENTS.
(Application filed July 28, 1900.)
(No Model.)

Witnesses:
Lewis P. Abell.
Benjamin B. Hull.

Inventor:
Jonathan E. Woodbridge
by Albert G. Davis,
Atty.

UNITED STATES PATENT OFFICE.

JONATHAN E. WOODBRIDGE, OF SCHENECTADY, NEW YORK, ASSIGNOR TO THE GENERAL ELECTRIC COMPANY, A CORPORATION OF NEW YORK.

METHOD OF TRANSFORMING ALTERNATING CURRENTS.

SPECIFICATION forming part of Letters Patent No. 717,488, dated December 30, 1902.

Application filed July 28, 1900. Serial No. 25,090. (No model.)

*To all whom it may concern:*

Be it known that I, JONATHAN E. WOODBRIDGE, a citizen of the United States, residing at Schenectady, county of Schenectady, State of New York, have invented certain new and useful Improvements in Methods of Transforming Alternating Currents, (Case No. 1,791,) of which the following is a specification.

My present invention relates to a method of phase transformation of value in interchangeably transforming two-phase and three-phase systems, although it is not limited to use in this connection only. In methods of phase transformation commonly employed the transforming capacity of the apparatus as compared with its capacity for transforming the same power without changing the number of phases is to some extent reduced by reason of increased heating due to the fact that the current in some of the windings is out of phase with the electromotive force of the windings themselves.

In carrying my invention into operation I make use of a system of transformers in which at unit-power factor the current in every winding is in phase with the electromotive force of that winding, thereby obviating the objection heretofore specified and attaining at the same time increased efficiency.

My invention will better be understood by reference to the following detailed description, while its points of novelty will be set forth in the claims appended thereto.

Figure 1:
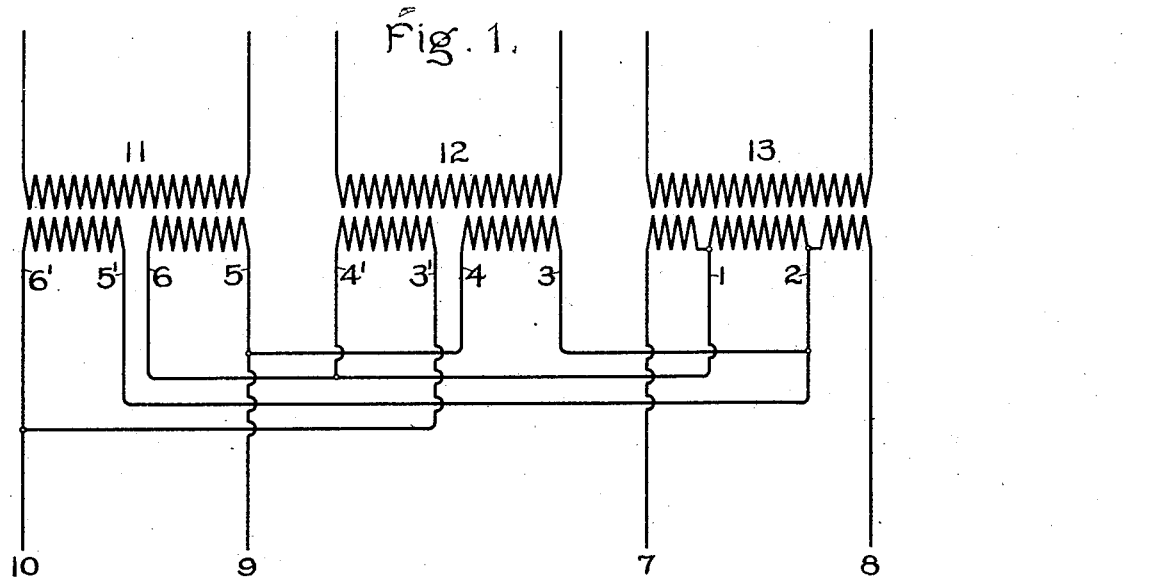
Figure 2:
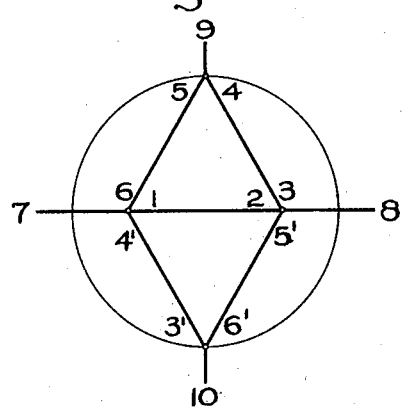

In the drawings, Figure 1 is a diagram of circuits representing an arrangement appropriate for transforming three-phase current to two-phase or the reverse. Fig. 2 is a diagram of electromotive forces of assistance in explaining the connections set forth in Fig. 1.

In Fig. 1 it will be assumed that three-phase current is to be transformed to two-phase, thereby rendering one set of windings primary in their function and another set of windings secondary; but it is to be understood that these relations will be reversed in transforming from two-phase to three-phase. Merely by way of illustration, therefore, let the windings 11 12 13 represent primary windings connected to three-phase supply-mains. Each of the two primaries 11 and 12 is provided with two secondaries having the same electromotive force and current capacity. The primary 13, unlike the other primaries, is provided with a single secondary, which, however, has taps extending from intermediate points in its length, these taps being indicated at 12. The winding included between these taps is arranged to generate an electromotive force of the same value as that of any of the secondaries on the other transformers.

All of the secondaries above referred to are interlinked in a manner such as to present terminals from which two-phase currents may be derived. In order to accomplish this result, the secondaries may be connected so as to form a network of interlinked three-phase electromotive forces, such as represented by the vector diagram in Fig. 2. Referring to this diagram, it will be seen that there are two equilateral triangles joined base to base, so as to form an equilateral polygon the diagonals of which form an angle of ninety degrees with each other. For convenience in explanation, each side of this polygon is designated by two numbers placed, respectively, at its opposite ends. Since the parallel sides of the polygon represent duplicate electromotive forces, these sides have been designated by the same numbers, which, however, are distinguished from each other by suitable indexes. Thus the side 4 3 is produced by an electromotive force of the same value and phase as the side 4' 3'.

In connecting up the transformer-windings a circuit is first formed including a secondary from each of the transformers, these secondaries being connected up in series with each other—as, for example, by the circuit extending from the terminal 1 of the secondary of the transformer 13—through the secondary 6 5 of the transformer 11, then through the secondary 4 3 of the transformer 12, and back to the other terminal of the secondary 1 2. The diagram of electromotive forces is then represented by a triangle having its sides numbered in the order in which the current flows through the winding. The arrangement of electromotive forces corresponding to the connections just described is indicated in Fig. 2 by the sequence of terminals 1 6 5 4 3 2. The remaining secondaries 6' 5' and 4' 3' must now be connected up to the secondary 1 2 in a reverse order, so as to produce the arrangement of electromotive forces indicated in the lower part of the diagram in Fig. 2. These connections consist, as will readily be seen, of a circuit extending from the terminal 1 through the secondary 4' 3', then through the secondary 6' 5', and back to the terminal 2.

Referring to Fig. 2, it will readily be seen that one of the two-phase circuits extends from the free terminals 7 8 of the transformer 13, while the other two-phase circuit consists of two terminals 9 10, one of which leads from the conductor joining the secondary terminals 4 5 and the other from the conductor joining the secondary terminals 3' 6'. In order to secure a symmetrical two-phase system, the secondary winding 1 2 is extended on each side of the terminals 1 2 by an amount sufficient to make the electromotive force between the mains 7 and 8 equal to the resultant between the mains 9 10. From the geometry of the figure it will be seen that the electromotive force of the extended portions of the winding is equal to about one-third of that between the terminals 1 2.

What I claim as new, and desire to secure by Letters Patent of the United States, is—

1. The method which consists in generating electromotive forces and connecting said electromotive forces corresponding to two of the three phases of a three-phase system so as to produce an equilateral parallelogram of electromotive forces, whereby the resultant electromotive forces corresponding to diagonals of the parallelogram bear a quarter-phase relation to each other.

2. The method of phase transformation which consists in connecting one of the phases of a three-phase system to a quarter-phase system whereby it corresponds to one phase of the latter system, coupling electromotive forces corresponding to the other two phases of the three-phase system so as to produce a closed equilateral polygon of electromotive forces, and deriving from the coupled electromotive forces a resultant electromotive force in phase with the other phase of the quarter-phase system.

3. The method which consists in connecting one of the phases of a three-phase system to a quarter-phase system whereby it corresponds to one phase of the latter system, coupling electromotive forces corresponding to the other two phases of the three-phase system so as to produce a closed equilateral parallelogram of electromotive forces, and deriving from the coupled electromotive forces a resultant electromotive force in phase with the other phase of the quarter-phase system.

4. The method which consists in connecting one of the phases of a three-phase system to a quarter-phase system whereby it corresponds to one phase of said system, coupling electromotive forces corresponding to the other two phases of the three-phase system so as to produce a closed polygon of electromotive forces, and deriving from the coupled electromotive forces a resultant electromotive force in phase with the other phase of the quarter-phase system.

5. The method of transforming three-phase current into quarter-phase current, which consists in generating three-phase fluxes by the action of the three-phase current, deriving separately-existing three-phase electromotive forces by the action of said fluxes and combining the three-phase electromotive forces to produce quarter-phase electromotive forces.

6. The method of combining three-phase electromotive forces which consists in connecting electromotive forces corresponding to two of the phases so as to produce an equilateral parallelogram of electromotive forces, and combining with said electromotive forces an electromotive force representing a diagonal of said parallelogram.

7. The method of combining three-phase electromotive forces which consists in connecting electromotive forces corresponding to two of the phases so as to produce a parallelogram of electromotive forces, and combining with said electromotive forces an electromotive force representing a diagonal of said parallelogram.

8. The method of transferring energy between three-phase mains and quarter-phase mains, which consists in utilizing three-phase fluxes, maintaining three-phase currents in coils in inductive relation to the fluxes, transferring one of the quarter-phase currents through a three-phase winding in phase therewith and the other quarter-phase current through a combination of three-phase windings.

In witness whereof I have hereunto set my hand this 26th day of July, 1900.

JONATHAN E. WOODBRIDGE.

Witnesses:
BENJAMIN B. HULL,
JAMES J. HIGGINS.